United States Patent [19]

Lee et al.

[11] Patent Number: 4,913,778
[45] Date of Patent: Apr. 3, 1990

[54] MOLTEN SALT SCRUBBING OF ZIRCONIUM OR HAFNIUM TETRACHLORIDE

[75] Inventors: Ernest D. Lee, Ogden, Utah; David F. McLaughlin, Oakmont, Pa.

[73] Assignee: Westinghouse Electric Corp., Pittsburgh, Pa.

[21] Appl. No.: 305,125

[22] Filed: Jan. 2, 1989

[51] Int. Cl.$^4$ .................. C01G 25/04; C01G 27/04
[52] U.S. Cl. .................... 203/29; 203/42; 203/50; 203/51; 55/72; 55/82; 423/77; 423/84; 423/492
[58] Field of Search ............ 203/29, 50, 51, 42; 423/73, 76, 77, 78, 492, 84; 55/72, 82

[56] References Cited

U.S. PATENT DOCUMENTS

| | | | |
|---|---|---|---|
| 2,744,060 | 5/1956 | Eaton | 423/73 |
| 2,816,814 | 12/1957 | Plucknett | 203/71 |
| 2,852,446 | 9/1958 | Bromberg | 203/1 |
| 2,928,722 | 3/1960 | Scheller | 203/51 |
| 2,938,679 | 5/1960 | Overholser | 423/70 |
| 3,006,719 | 10/1961 | Miller | 423/70 |
| 3,053,620 | 9/1962 | Greenberg et al. | 423/77 |
| 3,098,722 | 7/1963 | Carlson et al. | 423/84 |
| 3,671,186 | 6/1972 | Ishizuka | 423/73 |
| 3,966,458 | 6/1976 | Spink | 75/84.5 |
| 4,021,531 | 4/1977 | Besson | 423/492 |
| 4,737,244 | 4/1988 | McLaughlin | 203/51 |
| 4,749,448 | 6/1988 | Stoltz | 203/51 |

FOREIGN PATENT DOCUMENTS

| | | | |
|---|---|---|---|
| 45270 | 2/1982 | European Pat. Off. | 423/73 |
| 2543162 | 9/1984 | France . | |

Primary Examiner—Wilbur Bascomb
Attorney, Agent, or Firm—R. A. Stoltz

[57] ABSTRACT

Removal of aluminum and iron impurities is accomplished using an absorbing column containing potassium or sodium chloride, producing an aluminum and iron chloride-rich bottoms product and purified $Zr(Hf)Cl_4$ vapor at the top of the column. This invention is a continuous process for removing impurities of iron or aluminum chloride or both from vaporous zirconium chloride (or hafnium chloride or a mixture thereof). When iron is being removed from zirconium tetrachloride using potassium chloride, the process comprises: introducing impure zirconium chloride vapor into a middle portion of an absorbing column containing a potassium chloride-containing molten salt phase, the molten salt phase absorbing the iron chloride impurity to produce a zirconium chloride vapor stripped of iron chloride in the top portion of the column; introducing potassium chloride into a top portion of the column; controlling the top portion of the column to between 300°–375° C.; heating a bottom portion of the column to 450°–550° C. to vaporize zirconium chloride from the molten salt; withdrawing molten salt substantially free of zirconium and hafnium chloride from the bottom portion of the column; and withdrawing zirconium chloride vapor substantially free of iron chloride impurity from the top of the column. Similarly, hafnium or hafnium-zirconium mixtures can be substituted for zirconium, or aluminum or iron-aluminum can removed rather than iron, or sodium chloride or sodium potassium chloride mixtures can be substituted for potassium chloride.

7 Claims, 2 Drawing Sheets

FIG. I.

MOLTEN SALT SCRUBBING OF ZIRCONIUM OR HAFNIUM TETRACHLORIDE

CROSS-REFERENCE TO RELATED APPLICATIONS

A process for zirconium-hafnium separation is described in related application Ser. No. 242,574, filed Sept. 12, 1988, now U.S. Pat. No. 4,865,693, and assigned to the same assignee. That related application utilizes a complex of zirconium-hafnium chlorides and phosphorus oxychloride prepared from zirconium-hafnium chlorides, with the complex of zirconium-hafnium chlorides and phosphorus oxychloride being introduced into a distillation column, and a hafnium chloride enriched stream taken from the top of the column and a zirconium enriched chloride stream taken from the bottom of the column, and in particular with prepurifing said zirconium-hafnium chlorides prior to introduction of said complex into a distillation column to substantially eliminate iron chloride from the zirconium-hafnium chlorides, whereby buildup of iron chloride in the distillation column is substantially eliminated and the column can be operated in a continuous, stable manner.

A improved process for prepurification of zirconium-hafnium chlorides prior to preparation of a complex of zirconium-hafnium chlorides and phosphorus oxychloride for use in a distillation column for zirconium-hafnium separation is described in related application Ser. No. 242,572, filed Sept. 12, 1988, now U.S. Pat. No. 4,865,695 and assigned to the same assignee. That related application utilizes prepurification of zirconium-hafnium chlorides prior to complexing with phosphorus oxychloride by passing the zirconium-hafnium chloride through an essentially oxygen-free molten salt purification-sublimation system, and at least periodically removing iron chloride from the molten salt purification-sublimation system by electrochemically plating iron out of molten salt purification-sublimation system, the molten salt in the molten salt purification-sublimation system consisting essentially of a mixture of alkali metal and alkaline earth metal chlorides, zirconium-hafnium chlorides and impurities.

A process for zirconium-hafnium separation is described in related application Ser. No. 242,571, filed Sept. 12, 1988, now U.S. Pat. No. 4,865,694 and assigned to the same assignee. That related application utilizes a complex of zirconium and hafnium chlorides and phosphorus oxychloride introduced into a distillation column, with a hafnium chloride enriched stream of complex taken from the top of the column and a zirconium enriched chloride stream of complex taken from the bottom of the column, followed by reduction of the zirconium or hafnium chloride from the complex taken from the distillation column by electrochemically plating zirconium or hafnium out of a molten salt bath, with the molten salt in the molten salt bath consisting principally of a mixture of alkali metal and alkaline earth metal chlorides and zirconium or hafnium chloride.

A process for zirconium-hafnium separation is described in related application Ser. No. 242,570, filed Sept. 12, 1988, now U.S. Pat. No. 4,874,475 and assigned the same assignee. That related application utilizes an extractive distillation column with a mixture of zirconium and hafnium tetrachlorides introduced into a distillation column and a molten salt solvent circulated through the column to provide a liquid phase, and with the molten salt solvent consisting principally of lithium chloride and at least one of sodium, magnesium and calcium chlorides. Stripping of the zirconium chloride taken from the bottom of distillation column is provided by electrochemically reducing zirconium from the molten salt solvent. A pressurized reflux condenser is used on the top of the column to add hafnium chloride to the previously stripped molten salt solvent, which is being circulated back to the top of the column.

A process for zirconium-hafnium separation is described in related application Ser. No. 242,564, filed Sept. 12, 1988, and assigned to the same assignee. That related application utilizes a feed containing zirconium and hafnium chlorides introduced into a distillation column, and a hafnium chloride enriched stream taken from the top of the column and a zirconium enriched chloride stream taken from the bottom of the column, and with reduction to metal of the zirconium and/or hafnium chloride taken from the distillation column by electrochemically reducing an alkaline earth metal in a molten salt bath with the molten salt in the molten salt bath consisting principally of a mixture of at least one alkali metal chloride and at least one alkaline earth metal chloride and zirconium or hafnium chloride, with the reduced alkaline earth metal reacting with the zirconium or hafnium chloride to produce zirconium or hafnium metal product and alkaline earth metal chloride.

A process for separating nickel from zirconium for recycling nickel-containing zirconium alloy is described in related application Ser. No. 242,573, filed Sept. 12, 1988, now abandoned and assigned to the same assignee. That related application utilizes placing nickel-containing zirconium in a molten salt bath with the molten salt in the molten salt bath consisting principally of a mixture of at least two alkali metal fluorides to produce a molten salt bath containing dissolved zirconium or dissolved zirconium or both, electrochemically plating the nickel from the molten salt bath at a voltage sufficient to plate nickel but less than the voltage required to plate zirconium to provide an essentially nickel-free molten salt bath; and electrochemically reducing the zirconium from the essentially nickel-free molten salt bath to provide an essentially nickel-free zirconium.

A process for removing phosphorus oxychloride from a complex of zirconium or hafnium chloride and phosphorus oxychloride is described in related application Ser. No. 242,563, filed Sept. 12, 1988, now U.S. Pat. No. 4,865,696 and assigned to the same assignee. That related application utilizes a lithium-potassium chloride molten salt absorber vessel with a condenser which has the complex of zirconium or hafnium chloride and phosphorus oxychloride as the condensing fluid to scrub zirconium or hafnium chloride from the phosphorus oxychloride vapor. The process uses at least one separate vessel to strip the zirconium or hafnium chloride from the lithium-potassium chloride molten salt.

BACKGROUND OF THE INVENTION

Zirconium is widely used as a structural material in the nuclear industry, because of its corrosion resistance, good mechanical properties, and low neutron absorption cross-section. In order to use zirconium for nuclear-grade applications, impurity concentrations of hafnium must first be removed. Hafnium inevitably occurs naturally with zirconium ores, having very similar chemical properties; hafnium, however, has a much higher neutron absorption cross-section. Removal to 100 ppm or less is therefore required.

Because of the chemical similarity of these two elements, their separation is difficult, likened to that of isotopes of the same element. A large number of technologies have been studied to accomplish this separation, with aqueous-organic solvent extraction being the procedure used in the United States. This process is effective at removal not only of hafnium, but also a number of other contaminant metals which occur in the zircon sand used as feed, including iron, aluminum, and titanium. Solvent extraction, however, is a complex process which is difficult to control, requires multiple processing steps (including aqueous solvation of $ZrCl_4$ and subsequent chlorination back to the non-aqueous tetrachloride), and generates large quantities of waste solutions. Because of the cost and potential environmental liability associated with this process, the industry has long expressed interest in non-aqueous processing, in which the Zr-Hf separation would be carried out in the non-aqueous chloride phase.

The technique currently in use in the United States involves liquid-liquid extraction of aqueous zirconyl chloride thiocyanate complex solution using methyl isobutyl ketone, generally as described in U.S. Pat. No. 2,938,679, issued to Overholser on May 31, 1960, with the removal of iron impurities prior to solvent extraction as described in U.S. Pat. No. 3,006,719, issued to Miller on Oct. 31, 1961.

Several other processes have been suggested for separation of the metal tetrachlorides generated from the ore by carbochlorination. As noted above, the use of a non-aqueous separation offers significant economic incentive over those processes requiring aqueous zirconium solutions. Direct distillation of the tetrachlorides provides one possible route, relying on the difference in boiling points between zirconium tetrachloride and hafnium tetrachloride. Unfortunately, direct distillation cannot be accomplished at near atmospheric pressure, since neither tetrachloride exhibits a liquid phase except at very high pressure. U.S. Pat. No. 2,852,446, issued to Bromberg on Sept. 16, 1958, describes a high pressure distillation process where the pressure, rather than a solvent, provides for a liquid phase.

U.S. Pat. No. 2,816,814 issued to Plucknett on Dec. 17, 1957, describes extractive distillation for separation of the tetrachlorides using a stannous chloride solvent. U.S. Pat. No. 2,928,722 to Scheller, issued Mar. 15, 1960, describes the batch fractional distillation of niobium and tantalum chlorides to separate these chlorides from each other and from other chloride impurities, and uses a "flux" to provide the molten salt phase, utilizing either zirconium tetrachloride-phosphorus oxychloride complex or an alkali metal chloride and aluminum (or iron, or zirconium) chloride mixture as the flux. U.S. Pat. No. 3,966,458 issued to Spink on June 29, 1976 provides a sodium-potassium-zirconium chloride solvent for use in the extractive distillation of zirconium and hafnium tetrachlorides. U.S. Pat. No 3,671,186 issued to Ishizuka on June 20, 1972 utilizes a series of reaction and dissociation stages with a solvent such as sodium chloride. U.S. Pat. No. 4,021,531 issued to Besson on Apr. 3, 1977, utilizes extractive distillation with an alkali metal chloride and aluminum (or iron) chloride mixture as the solvent. Extractive distillation of zirconium (hafnium) tetrachloride with a pure zinc chloride solvent has been attempted (Plucknett et al., AEC Report ISC-51, 1949), but was unsuccessful due to the formation of a highly viscous two-phase system. The anomalously high viscosity of zinc chloride is described by MacKenzie and Murphy (J. Chem. Phys., 33, 366, 1960). U.S. Pat. No. 4,737,244 to McLaughlin et al. describes an extractive distillation method for separating hafnium from zirconium of the type wherein a mixture of zirconium and hafnium tetrachlorides is introduced into a distillation column, with a molten salt solvent being circulated through the column to provide a liquid phase, and the improvement comprising having a molten salt solvent composition of at least 30 mole percent zinc chloride and at least 10 mole percent of lead chloride. A somewhat similar process for zirconium-hafnium separation is described in U.S. Pat. No. 4,749,448 issued June 7, 1988 to Stoltz et al, which provides for zirconium-hafnium separation by extractive distillation with the molten solvent containing at least 80 mole percent zinc chloride, with the remainder including a viscosity reducer of magnesium chloride, calcium chloride, or mixtures thereof.

Of all the molten salt distillation processes, only the above-mentioned Besson process has been brought to commercial development. This process is currently in use by Cezus in France and provides product zirconium tetrachloride, relatively depleted of hafnium tetrachloride in the liquid bottoms stream, and a hafnium tetrachloride enriched vapor stream taken from the top of the column. A relatively high reflux is provided by a condenser at the top of the column and a reboiler at the bottom of the column. Because of the stability of the double salts formed with the alkali metal chloride in the solvent, it is very difficult to completely separate the product zirconium tetrachloride from the solvent, and relatively high (e.g. 500° C.) temperatures are required. Aluminum chloride in excess of 1:1 molar to alkali metal chloride is required and there is considerable carry-over of aluminum chloride into the zirconium tetrachloride leaving the stripper. French Patent No. 2,543,162 (9-28-84) to Brun and Guerin describes an essentially constant temperature post-stripping process for removing aluminum chloride from zirconium tetrachloride. In addition, it should be noted that aluminum chloride is an especially hygroscopic and corrosive molten salt, and, at higher temperatures, is very difficult to handle.

One problem which may exist in such systems is the necessity of separate processing steps to remove metallic impurities. In the $POCl_3$ complex separation process, for example, iron will concentrate in the bottoms $ZrCl_4$ stream, titanium in the tops $HfCl_4$ stream, while aluminum will partition between the two. If the feed contains unacceptable levels of iron or aluminum (based on the requirements for the final zirconium product), additional processing must be incorporated to remove these contaminants before synthesis of the $POCl_3$ complex.

In addition, iron and aluminum are generally undesirable impurities in hafnium metal as well. Aluminum is especially difficult to remove down to acceptable levels in commercial aqueous processing. Further, iron is especially undesirable in the oxides of zirconium and hafnium, as the iron is not generally removed in the less extensive processing of the ore for the making of ceramics (typically zirconium-2% hafnium oxide), leading to undesirable discoloration of the ceramic.

SUMMARY OF THE INVENTION

Zirconium (and/or hafnium) is manufactured by reduction of the tetrachloride, which first must be purified to remove aluminum and/or iron impurities. This invention is a non-aqueous process which accomplishes this purification using an absorbing column containing potassium and/or sodium chloride, producing an aluminum and/or iron chloride-rich sodium and/or potassium chloride bottoms stream and purified $ZrCl_4$ (and-/or $HfCl_4$) vapor at the top of the column.

The purified product of this process can be further processed, for example, as feed for either a conventional liquid-liquid extraction or a phosphorous oxychloride distillative separation to produce zirconium metal and hafnium metal products. It can also be used to produce zirconium oxide (containing about 2 percent hafnium oxide), which, being iron free, is of very high whiteness.

This invention is a continuous process for removing impurities of iron or aluminum chloride or both from vaporous zirconium chloride (or hafnium chloride or a mixture thereof). When iron is being removed from zirconium tetrachloride using potassium chloride, the process comprises: introducing impure zirconium chloride vapor into a middle portion of an absorbing column containing a molten salt phase (the molten salt phase consisting principally potassium chloride, with at least one of zirconium chloride and iron chloride) the molten salt phase absorbing the iron chloride impurity (some zirconium chloride is also absorbed in the middle and top portions of the column) to produce a zirconium chloride vapor stripped of iron chloride in the top portion of the column; introducing potassium chloride into the top portion of the column; controlling the top portion of the column to between 300°–375° C.; heating a bottom portion of the column to 450°–550° C. to vaporize zirconium chloride from the molten salt; withdrawing molten salt substantially free of zirconium and hafnium chloride from the bottom portion of the column; and withdrawing zirconium chloride vapor substantially free of iron chloride impurity from the top of the column. Similarly, hafnium or hafnium-zirconium mixtures can be substituted for zirconium, or aluminum or iron-aluminum can removed rather than iron, or potassium chloride or sodium potassium chloride mixtures can be substituted for potassium chloride. Preferably, the zirconium chloride or hafnium chloride or hafnium and zirconium chloride vapor product contains less than 10 ppm of aluminum and the column is operated at about one atmosphere pressure. The column must be operated with a temperature difference of at least 75° C. from top to bottom (without the temperature difference from top to bottom, substantial amounts of zirconium-hafnium chloride and excessive potassium chloride are lost with the bottom waste stream), with the top portion of the column being preferably controlled to about 350° C. and the bottom portion of the column being controlled to about 500° C.

BRIEF DESCRIPTION OF THE DRAWINGS

The invention as set forth in the claims will become more apparent by reading the following detailed description in conjunction with the accompanying drawings, wherein like reference numerals refer to like parts through the drawings and in which:

DESCRIPTION OF THE PREFERRED EMBODIMENT

The present invention incorporates potassium chloride (KCl) or sodium chloride (NaCl) as a complexing agent to selectively remove iron and aluminum chlorides ($FeCl_3$ and $AlCl_3$) from a $ZrCl_4$ vapor stream, assumed to rise from chlorination of the zircon sand feed ore. Generally, for ease of description, the discussion will refer to zirconium, but it should be understood that the invention also covers hafnium or a zirconium-hafnium mixture, either of which can be similarly processed. The ternary phase diagram for the $ZrCl_4$-$AlCl_3$-KCl system (Morozov and Tsegledi, Russ. J. Inorg. Chem., 6(12), 1397, 1961 in FIG. 1; because of the chemical similarity of $AlCl_3$ to $FeCl_3$, the corresponding iron phase diagram will be qualitatively similar. It is seen that both the zirconium and aluminum (or iron) chlorides will form binary double-salt complexes with potassium chloride, having the chemical compositions $K_2ZrCl_6$ and $KAlCl_4$ ($KFeCl_4$). These may be considered as acid-base neutralization salts between the Lewis acids $ZrCl_4$ and $Al(Fe)Cl_3$, and the Lewis strong base KCl. Note that the Lewis acidity of the iron and aluminum chlorides is considerably greater than that of $ZrCl_4$; thus the stabilities of the $KAlCl_4$ and $KFeCl_4$ complexes are greater than that of $K_2ZrCl_6$.

Figure 1:
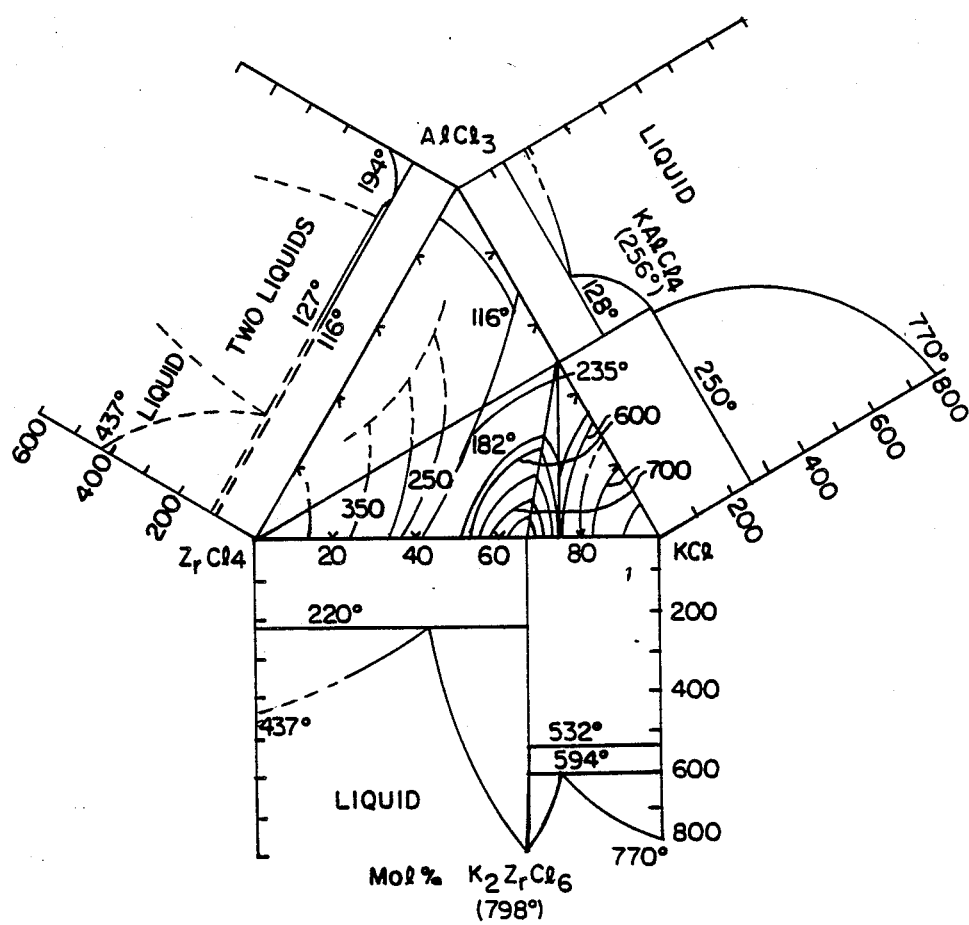
FIG. 1 is a ternary phase diagram of zirconium tetrachloride, aluminum chloride, and potassium chloride.

If a vapor stream containing zirconium, aluminum, and iron chlorides is contacted with divided KCl, the three vapor-phase chlorides will react with the potassium chloride to form the above double salts, which in turn will form low- melting eutectic phases as shown in FIG. 1. It is seen that three ternary eutectic compositions exist, at 116°, 182°, and 235° C. Because of the nature of such eutectic systems, the liquid phase will gravitate toward the eutectic composition, with the relative quantities of solid and liquid at equilibrium being determined by the overall composition of the total mixture. The lowest- melting liquid phase therefore will consist of $Al(Fe)Cl_3$-$KAl(Fe)Cl_4$, with a few percent of dissolved $ZrCl_4$.

At temperatures above the eutectic melting point, these solutions will not be stable indefinitely, but will exist in equilibrium with the partial pressures of the uncomplexed $ZrCl_4$, $AlCl_3$, and $FeCl_3$ in the vapor phase. The equilibrium vapor pressure of each is determined by the stability of the double-salt species, so that at a given temperature, $ZrCl_4$ will evaporate from the melt phase to a higher degree than will $AlCl_3$ or $FeCl_3$. This forms the basis of the purification process.

Figure 2:
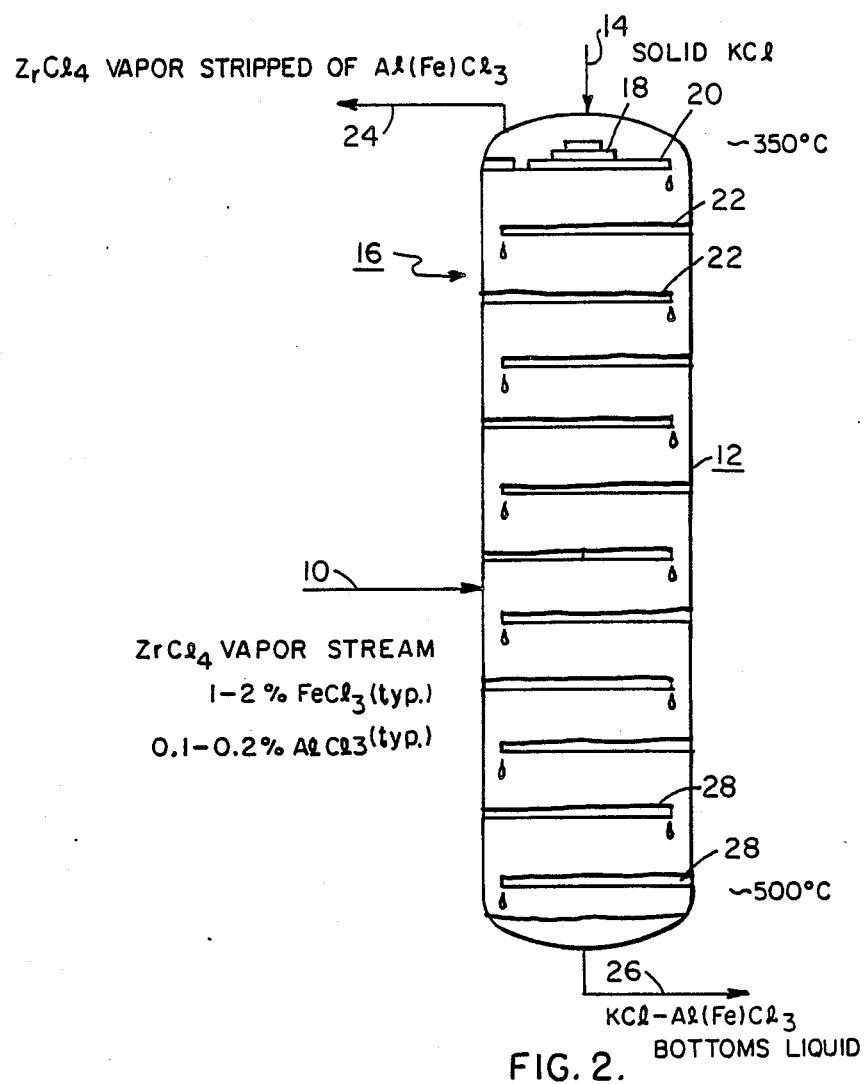
FIG. 2 is a process schematic.

The process is shown schematically in FIG. 2. The $ZrCl_4$ feed stream 10, generally contaminated with both aluminum and iron chloride vapors, enters the middle of the absorption column 12. Typical contaminant levels might be 1–2 mole percent $FeCl_3$, and 0.1–0.2 mole percent $AlCl_3$. Solid, divided KCl 14 can be added at the top of the column 16 onto a distributor 18, designed to spread the solid salt over a large surface area to maximize contact with the uprising vapors. As the vapor stream contacts the potassium chloride, a molten salt phase 20 will begin to form, rich in zirconium chloride. The upper portion of the column can use a series of bubble cap plates 22 to provide good contacting between the liquid and vapor phases. The upper end of the column is preferably maintained at approximately 350° C., at which point the vapor pressure of $ZrCl_4$ over $K_2ZrCl_6$ is roughly one atmosphere (Kim and Spink, J. Chem. Eng. Data, 19(1), 36, 1974), while the vapor pressure of $AlCl_3$ over $KAlCl_4$ is estimated to be only 0.001 Torr (computed from results presented in Linga et al., Ber. Busenges. Phys. Chem., 82(1), 568, 1978). The vapor 24 leaving the cool end of the column will therefore have an aluminum content of order only 0.001/760=1.3 ppm, assuming good phase contact and establishment of equilibrium conditions.

Note that the actual species pressures over the liquid phase will depend not only on the pure-component vapor pressures, but also the liquid-phase mole fractions of each species, and on the activity coefficients. The solutions are also expected to be far from ideal due to the strong solvent interaction. Therefore, the above vapor pressures are to be taken as qualitative examples of the expected efficiency of the process, rather than quantitative performance data. Note that the entire process may be operated at or near atmospheric pressure.

The aluminum and iron, which are removed from the vapor phase, enter the liquid phase, the quantity of which liquid phase depends somewhat on the impurity content of the vapor stream; that is, liquid will be formed at the distributor plate 18 at a faster rate if there are more aluminum and iron chlorides. Note that this process also removes some other impurities (e.g. Ti, V, U, and Si) from $Zr(Hf)Cl_4$. Eventually, sufficient liquid phase accumulates to overflow the upper plates, and form a liquid inventory throughout the length of the column. The liquid gradually flows downward through the column, eventually being removed as a waste stream 26 from the bottom (with overflow pans 28 in the bottom portion of the column, waste stream flow is also somewhat selfregulating, because removal of zirconium tetrachloride (due to the higher temperature at the bottom of the column) will cause solids formation until there is sufficient impurity content buildup to again liquify the salt). Thus the waste stream is substantially free of zirconium and hafnium chloride and is very impurity rich, and does not contain excessive potassium (or sodium) chloride. The lost KCl is generally replenished by continuous addition of small quantities of solid salt from the top. Although typically solid KCl (and/or NaCl) is added directly to the top of the column, a liquid can be added at the top by forming of the zirconium (hafnium) potassium chloride double salt in a separate vessel, to initially start up the column, and also during steady state operation.

This liquid phase, especially at the top of the column, contains considerable $ZrCl_4$ as well; at 350° C., the solubility of $ZrCl_4$ in $KAlCl_4$ is nearly 30 mole percent (Besson et al., above), and therefore should be recovered. This can done by maintaining a temperature gradient along the length of the column, with the bottom being held at elevated temperatures of order 500° C. At this temperature (approximately the stripping temperature used in the CEZUS process), the vapor pressure of $ZrCl_4$ over $K_2ZrCl_6$ exceeds three atmospheres (Kim and Spink, above), leading to evaporation of most of the zirconium from the liquid phase back up the column. At this temperature, the vapor pressure of $AlCl_3$ over $KAlCl_4$ has increased only to 0.5 Torr (again based on calculations after Linga, above). Therefore, while some aluminum chloride is evaporated back up the column for reabsorption at lower temperature, very little zirconium tetrachloride leaves the tower with the liquid stream. Similar arguments apply to removal of iron chloride.

While the preferred embodiments described herein set forth the best mode to practice this invention presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. A continuous process for removing impurities of iron or aluminum chloride or both from vaporous zirconium or hafnium chloride or both; said process comprising:
   a. introducing impure zirconium or hafnium chloride vapor or both into a middle portion of an absorbing column containing a molten salt phase, said molten salt phase principally comprising; sodium or potassium chloride or both, zirconium or hafnium chloride or both, and iron or aluminum chloride or both, said molten salt phase absorbing said impurities of iron or aluminum chloride or both to produce chloride vapor stripped of zirconium or hafnium chloride;
   b. introducing sodium or potassium chloride or both into a top portion of said column;
   c. controlling the top portion of said column to between 300–375° C.;
   d. heating a bottom portion of said column to 450–550° C. to vaporize zirconium chloride or hafnium chloride or hafnium and zirconium chloride from said molten salt;
   e. withdrawing molten salt substantially free of zirconium and hafnium chloride from the bottom portion of said column; and
   f. withdrawing zirconium chloride or hafnium chloride or hafnium and zirconium chloride vapor substantially free of impurities of iron and aluminum chloride from the top of said column.

2. The method of claim 1, wherein the zirconium chloride or hafnium chloride or hafnium and zirconium chloride vapor contains less than 10 ppm of aluminum.

3. The method of claim 1, wherein the top portion of said column is controlled to about 350° C.

4. The method of claim 1, wherein the bottom portion of said column is controlled to about 500° C.

5. The method of claim 1, in which the column is operated at about one atmosphere pressure.

6. The method of claim 1, wherein the column is operated with a temperature gradient from top to bottom, with the top portion of said column being controlled to about 350° C. and the bottom portion of said column being controlled to about 500° C.

7. A continuous process for removing impurities of iron and aluminum chloride from vaporous zirconium chloride; said process comprising:
   a. introducing impure zirconium chloride vapor into a middle portion of an absorbing column containing a molten salt phase, said molten salt phase principally comprising; potassium chloride, zirconium chloride, and iron and aluminum chloride, said molten salt phase absorbing said impurities of iron and aluminum chloride to produce chloride vapor stripped of zirconium chloride;
   b. introducing potassium chloride into a top portion of said column;
   c. controlling the top portion of said column to between 300–375° C.;
   d. heating a bottom portion of said column to 450–550° C. to vaporize zirconium chloride from said molten salt;
   e. withdrawing molten salt substantially free of zirconium chloride from the bottom portion of said column; and
   f. withdrawing zirconium chloride vapor substantially free of impurities of iron and aluminum chloride from the top of said column.

* * * * *